Figures 1, 2, 3, 4:
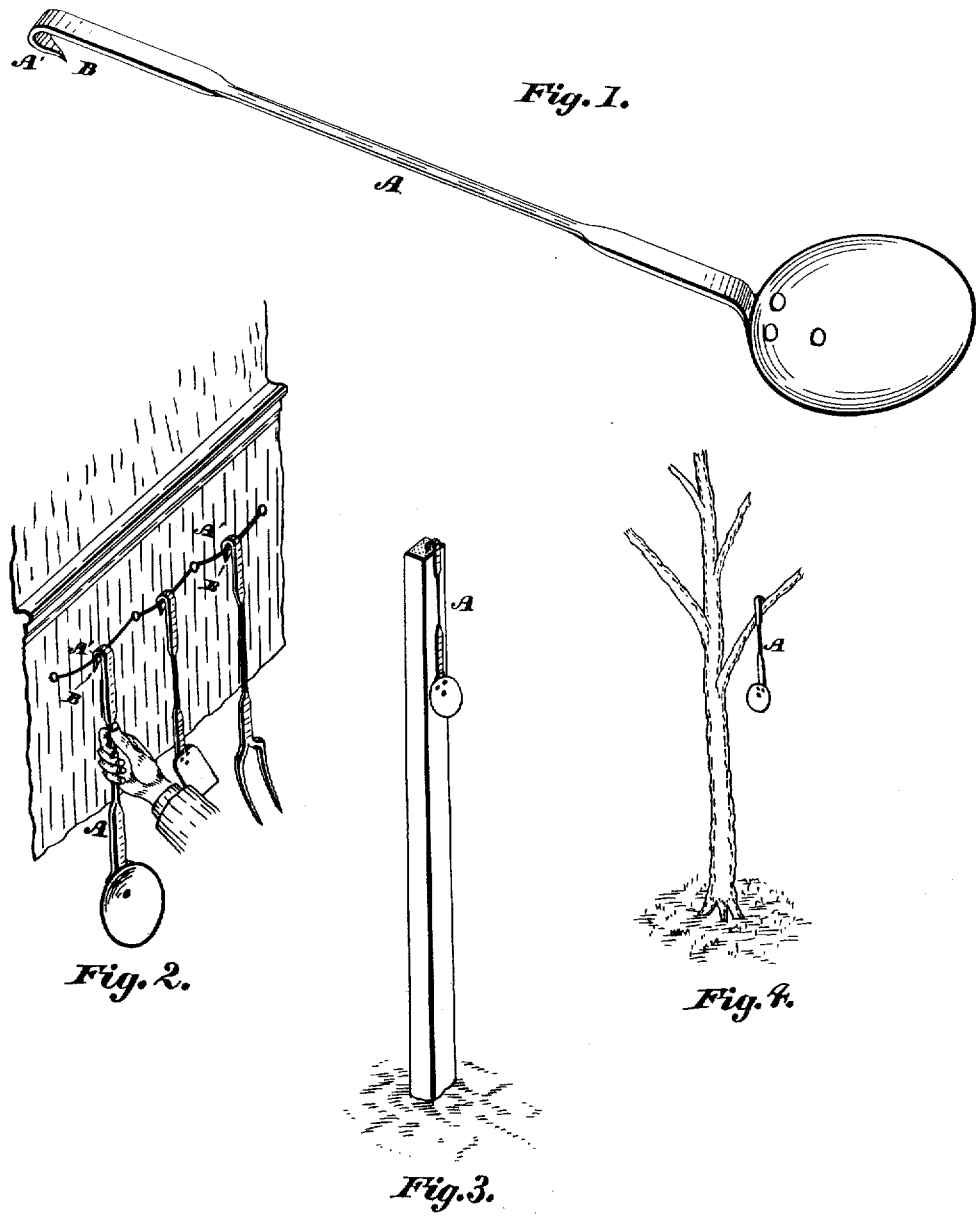

(No Model.)

F. B. SMITH.
HANDLE.

No. 334,993. Patented Jan. 26, 1886.

WITNESSES
Harry Frease
John E. Monnot

INVENTOR
Fernand B. Smith
By Fred W. Bond, Attorney

UNITED STATES PATENT OFFICE.

FERNANDO B. SMITH, OF CANTON, OHIO.

HANDLE.

SPECIFICATION forming part of Letters Patent No. 334,993, dated January 26, 1886.

Application filed November 20, 1885. Serial No. 183,459. (No model.)

*To all whom it may concern:*

Be it known that I, FERNANDO B. SMITH, a citizen of the United States, residing at Canton, in the county of Stark and State of Ohio, have invented certain new and useful Improvements in Handles; and I do hereby declare that the following is a full, clear, and exact description of the same, reference being had to the annexed drawings, making a part of this specification, and to the letters and figures of reference marked thereon, in which—

Figure 1 is a perspective view showing handle attached to a ladle. Fig. 2 is a view showing manner of hanging handle to a wire or string. Fig. 3 is a view showing manner of hanging handle to a post or like object. Fig. 4 is a view showing handle hung to a tree.

The present invention has relation to handles designed and calculated for ladles, skimmers, cake-turners, dippers, and forks, its object being to provide a handle that will be cheap, simple, and well calculated for the purposes designed, and at the same time can be easily attached to any convenient object without providing a means for attaching the same; and its nature consists in providing a sharp-pointed hook located at the end of the handle.

In the accompanying drawings, A represents the handle, which is preferably made of steel, and to one end of which is attached, in the ordinary manner, a skimmer, cake-turner, ladle, dipper, or fork. The opposite end of said handle A is provided with the bent or curved portion A', which may be substantially of the form shown in the drawings. This bent or curved portion A' is provided with a sharp or piercing point, B, said point being slightly bent or curved outward, so as to easily enter any object to which it to be attached.

It will be seen by my peculiar arrangement I am enabled to provide a handle that can be readily attached to any convenient object without first providing a means for the same.

I am aware that it is old to bend a handle to form a hook at one end.

What I claim, and desire to secure by Letters Patent, is—

As a new article of manufacture, a handle bent at the end to form a hook having a sharp piercing point, substantially as and for the purpose specified.

In testimony that I claim the above I have hereunto subscribed my name in the presence of two witnesses.

FERNANDO B. SMITH.

Witnesses:
HARRY FREASE,
FRED. W. BOND.